(12) United States Patent
Ye et al.

(10) Patent No.: US 12,287,037 B2
(45) Date of Patent: Apr. 29, 2025

(54) SHOWER CONTROLLING DEVICE

(71) Applicant: Xiamen Lota International Co., Ltd., Fujian (CN)

(72) Inventors: Liming Ye, Fujian (CN); Shuanglin Bai, Fujian (CN); Xinzong Huang, Fujian (CN); Chuanbao Zhu, Fujian (CN)

(73) Assignee: Xiamen Lota International Co., Ltd., Fujian (CN)

( * ) Notice: Subject to any disclaimer, the term of this patent is extended or adjusted under 35 U.S.C. 154(b) by 8 days.

(21) Appl. No.: 18/354,084

(22) Filed: Jul. 18, 2023

(65) Prior Publication Data

US 2024/0200671 A1 Jun. 20, 2024

(30) Foreign Application Priority Data

Dec. 14, 2022 (CN) .......................... 202211605858.1
Dec. 14, 2022 (CN) .......................... 202223356466.4

(51) Int. Cl.
*F16K 11/074* (2006.01)
*E03C 1/04* (2006.01)
*F16K 27/04* (2006.01)

(52) U.S. Cl.
CPC ........ *F16K 11/0743* (2013.01); *E03C 1/0408* (2013.01); *F16K 27/045* (2013.01)

(58) Field of Classification Search
CPC .... F16K 11/0743; F16K 27/12; E03C 1/0408; E03C 1/023; E03C 2201/50
See application file for complete search history.

(56) References Cited

U.S. PATENT DOCUMENTS 4,095,610 A * 6/1978 Priesmeyer ............. F16K 19/00
137/119.03
10,822,776 B2 * 11/2020 Blattner .................. E03C 1/021
(Continued)

*Primary Examiner* — Reinaldo Sanchez-Medina
(74) *Attorney, Agent, or Firm* — Knobbe, Martens, Olson & Bear, LLP

(57) ABSTRACT

A shower controlling device, comprising a body part, comprising multiple water inlets each for supplying hot fluid and cold fluid, water outlet(s) for discharging mixed fluid and outlet cavity, wherein these water inlets are disposed opposite to each other, and the water outlet(s) is disposed perpendicular to these water inlets, and the outlet cavity is configured as a centrosymmetric structure and connected with the water outlet(s); a mixing valve, which is engaged with the body part and configured for mixing the cold fluid and the hot fluid entering the body part; a switching valve, which is disposed downstream of the mixing valve and used for controlling the on-off of the mixed fluid entering the outlet cavity to the water outlet(s); a valve cover set, which is detachably engaged with the body part and the switching valve is sleeved therein so that the switching valve is engaged in a fixed way with the body part. The shower controlling device comprises the body part and the valve cover set with unique structural design, and the body part has the outlet cavity with inventive structural design, which avoids the occurrence of problem that the mixed fluid is limited on its flow due to the possible overlap of paths of the water outlets when it faces different water outlets 102. The valve cover set provides enhanced structural strength and facilitates to be installed and maintained.

9 Claims, 16 Drawing Sheets

(56) References Cited

U.S. PATENT DOCUMENTS

2018/0313066 A1\* 11/2018 Ye .................... E03C 1/0408
2020/0040557 A1\* 2/2020 Johnson ............ E03C 1/023
2020/0378507 A1\* 12/2020 Jones ................ E03C 1/0408

\* cited by examiner

E-E

SHOWER CONTROLLING DEVICE

TECHNICAL FIELD

The present disclosure relates to the technical field of sanitary equipment, and in particular, to a shower controlling device.

BACKGROUND

The shower controlling device provided by prior arts generally comprises many independent components (or fittings), which leads to that the operator has to face the problem losing parts when these components are on-site assembly. Moreover, such shower controlling device with many multi-components to be assembled is always inconvenient to be repaired, since its assembly is too complex. Furthermore, fluid paths in the shower controlling device usually have influence on the effluent effect of the fluid therein, e.g., insufficient flow, variational fluid temperature and other problems, which can lead to bad user experience.

Thus, there are requirements to improve the shower controlling device in the relevant technical field so as to further optimize the switching device that is applied, in particular the property of the vacuum load switch, which can improve or solve the problem presented in the prior arts.

SUMMARY OF THE DISCLOSURE

Therefore, it is an object of the present disclosure to provide a shower controlling device, thereby overcoming the disadvantages of the prior arts.

To implement above object, this invention provides a shower controlling device, wherein it comprises: a body part, comprising multiple water inlets supplying hot fluid and cold fluid respectively, water outlet(s) for discharging mixed fluid and an outlet cavity, wherein these water inlets are disposed opposite to each other, and the water outlet(s) is perpendicular to these water inlets, and the outlet cavity is configured as a centrosymmetric structure and communicated with the water outlet(s); a mixing valve, engaged with the body part and configured for mixing the cold fluid and the hot fluid entering the body part; a switching valve, disposed downstream of the mixing valve and controlling the on-off of the mixed fluid entering the outlet cavity to the water outlet(s); a valve cover set, detachably engaged with the body part and in which the switching valve is sleeved so as to fixedly engaged the switching valve to the body part.

As a preferred embodiment, the water outlets are configured in pairs, and disposed opposite to each other and perpendicular to the water inlets, and the outlet cavity is configured in a shape of S and could be communicated at each end to one of the water outlets controlled by corresponding switching valve.

As a preferred embodiment, the valve cover set comprises: a cover, comprising a base and a receiving portion, wherein the base is engaged to the body part and conformal to the outlet cavity of the body part, and the receiving portion extends perpendicular to the base so as to sleeve the switching valve therein; fasteners, configured for securing the cover to the body part.

As a preferred embodiment, the valve cover set further comprises a panel, which is conformal to the base and comprises: receiving holes, configured for the receiving portions of the cover to through therein, mounting holes, configured for the fasteners to through therein so as to engage the body part; the panel is configured to be sleeved on the cover through the receiving hole and fixed to the body part by means of the fastener going through the mounting hole so as to enhance the structural strength of the cover.

As a preferred embodiment, the base of the cover is provided with engagement holes, each of which is disposed correspondingly to the mounting hole and provided with a limiting portion, wherein the limiting portion is configured for preventing the fastener from leaving the base.

As a preferred embodiment, the fastener comprises: an engagement section, configured to pass through the engagement hole and enable to be detachably engaged to the body part, and the fastener is prevented from disengaging when moving in the direction of disengaging from the engagement hole due to obstruction of the projection against the engagement section a free section, configured to pass through the engagement hole and moved freely therein.

As a preferred embodiment, the axial length of the engagement section is less than that of the free section.

As a preferred embodiment, the body part further comprises: engagement lugs, wherein a pair of engagement lugs are disposed in the radial direction of the body part and correspondingly to the engagement holes; an engagement portion, disposed between the pair of engagement lugs and the engagement portion (108) is set above the engagement lugs.

As a preferred embodiment, further comprising a pair of one-way shut-off valve, the one-way shut-off valve (18) is engaged to the body part and located between the corresponding water inlet and the mixing valve.

As a preferred embodiment, further comprising a mixing valve cover, and the mixing valve cover, the mixing valve and the body part all three together, or the valve cover set and the body part both two together are configured as a preassembly.

A part of other features and advantages of the present disclosure will be apparent to the skilled person in the art after reading the disclosure, while the other part will be described in the following specific embodiment in combination with the drawings.

BRIEF DESCRIPTION OF DRAWINGS

Hereinafter, the embodiments of the present disclosure will be described in detail in combination with drawings, wherein.

DETAILED DESCRIPTION

Figure 1:
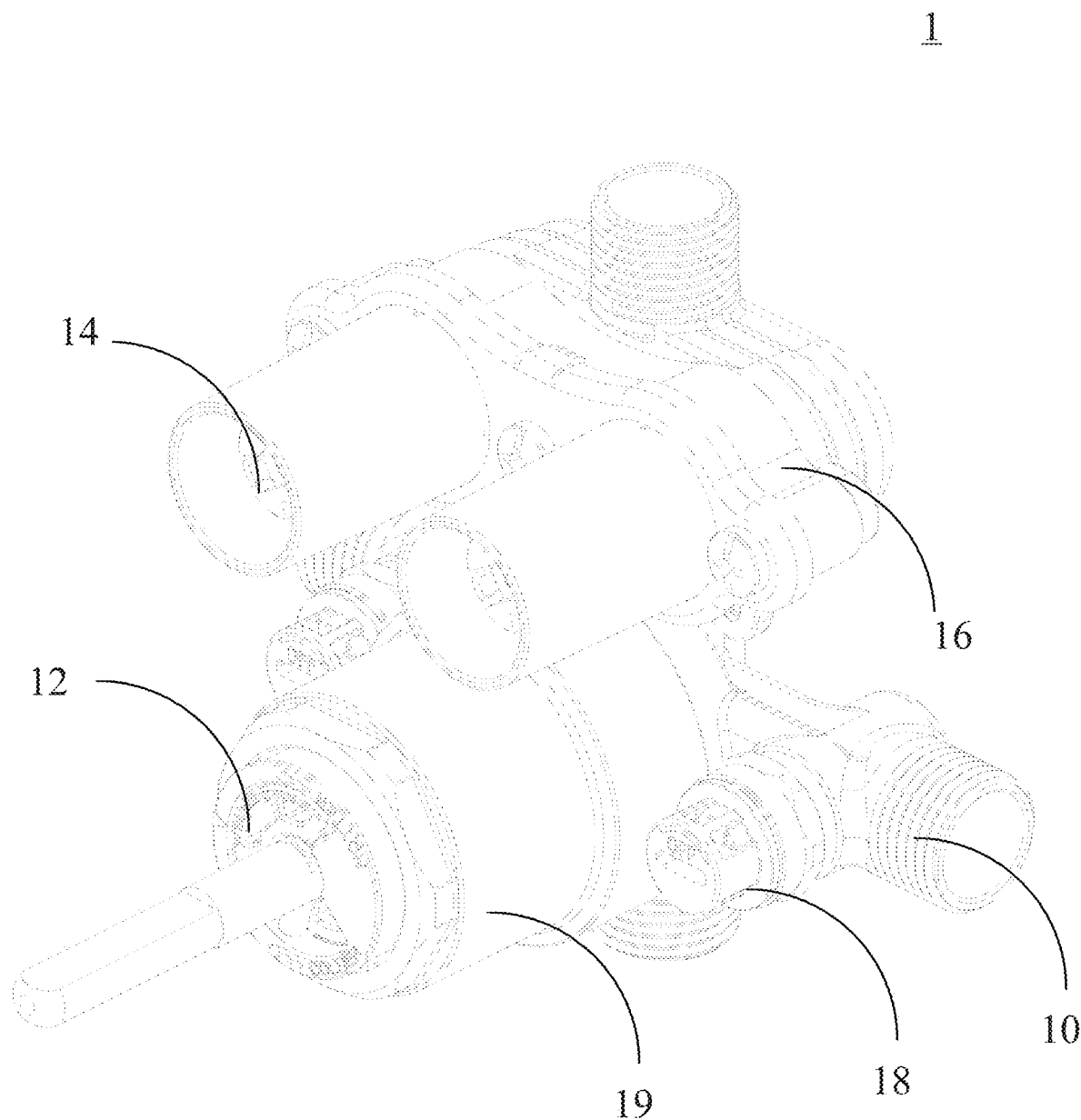
FIG. 1 is a perspective view of the shower controlling device according to present disclosure.

Now the schematic solutions of the shower controlling device in present disclosure will be described in detail. Although some drawings are provided to illustrate some embodiments of the present disclosure, these drawings may not necessarily be depicted in scale, and some features may be enlarged, removed or cut off in part to show and explain the disclosure of the present disclosure better. The positions of some elements in the drawings may be adjusted as desired without influencing the technical effect. The phrase "in the drawings" or the like presented in the description may not refer to all the drawings or examples.

Some orientation terms, e.g. "inner", "outer", "upper", "lower" and other orientation terms, as used hereinafter for describe the drawings will be understood as having their normal meanings and indicating those directions as involved when the drawings are viewed normally. Basically, the orientation terms as stated in the present specification will be interpreted according to the routine directions as understood by the skilled person in the art, unless otherwise specified.

The terms "first", "the first", "second", "the second" and the like as used in the disclosure do not represent any order, amount or importance in this invention, but rather are used to differentiate one element from other elements.

In this text, in terms of the term "general", it means that it is unnecessary for the parameter or value referred to be accurately accomplished, and the deviation or variation (in which the deviation or variation comprises, such as, tolerance, measuring error, measuring accuracy limit and other factors known by the skilled artisan) can be presented without prejudicing the mount of the technical effects expectantly provided by the technical feature.

FIG. 1 shows the shower controlling device 1 according to present disclosure, comprising a body part 10, a mixing valve 12, a switching valve 14, a valve cover set 16, a one-way shut-off valve 18 and a mixing valve cover 19. The body part 10 is generally made of metal, such as copper. The body part 10 has a first cavity for receiving the mixing valve 12, a second cavity for receiving the switching valve 14 and a third cavity for receiving the one-way shut-off valve 18. The mixing valve 12, the switching valve 14 and the one-way shut-off valve 18 can be detachably mounted to the body part 10. The mixing valve 12 is mounted to the body part 10 by the mixing valve cover 19 detachably (such as threaded joint) engaging with the first cavity and the mixing valve 12 is used for mixing hot fluid and cold fluid entering into the body part 10. The switching valve 14 is disposed at the downstream of the mixing valve 12 and mounted to the body part 10 by means of the valve cover set 16 detachably engaging with the second cavity. The one-way shut-off valve 18 is optional, such as a fast assembly one-way shut-off valve 18, and one-way shut-off valve 18 is engaged to the body part 10 and mounted on the path of the water inlet 100 that travels to the mixing valve 12 so as to avoid the adverse flow of the fluid.

Figure 2:
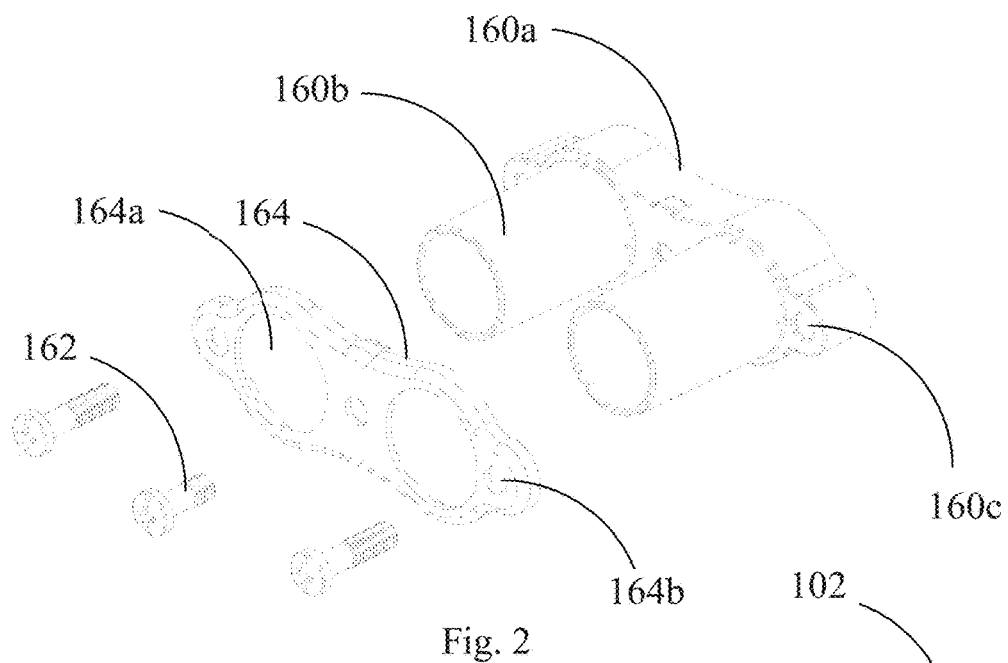
FIG. 2 is an exploded schematic view of the valve cover set of the shower controlling device according to present disclosure.

FIG. 2 shows the valve cover set 16 of the shower controlling device 1 in the disassembled state. The valve cover set 16 is detachable engaged to the body part 10 and the switching valve 14 is sleeved therein, so that the switching valve is fixedly engaged to the body part 10. The valve cover set 16 comprises a cover 160, a panel 164 and fastener 162. The cover 160 is usually made of non-metallic material, such as plastic. It is appreciated for the skilled artisan that the cover 160 is not limited to plastic.

The cover 160 comprises a base 160a and a receiving portion 160b, wherein the base 160a is engaged and conformal to the body part 10, in particular the outlet cavity 104 of the body part 10 described in detail in the following text. The receiving portion 160b extends perpendicular to the body part 10. The receiving part 160b is generally cylindrical and sleeved on the switching valve 14 after the receiving portion 106b being engaged to the body part 10.

The fasteners 162 are used to fix the cover 160 to the body part 10. Herein, the fastener 162 is optionally a fastening threaded structure, such as a bolt or a screw.

The panel 164 for example can be a metal plate, and it is conformed to the shape of the base 160a and comprises receiving holes 164a and mounting holes 164b, wherein the receiving hole 164a is used for the receiving portion 160b of the cover 160 going therethrough, and thus the receiving hole 164a can be conformal to the receiving portion 160b and generally configured to be circular. The mounting hole 164b can be used for the fastener 162 going therethrough so as to engage to the body part 10. The panel 162 is sleeved on the cover 160 by means of the receiving hole 164a, and is then fixed to the body part 10 by means of the fastener 162 passing through the mounting hole 164b, and thus providing an enhanced strength. The valve cover set 16 provided by present disclosure improves the assembly efficiency of the shower controlling device 1.

Figure 3:
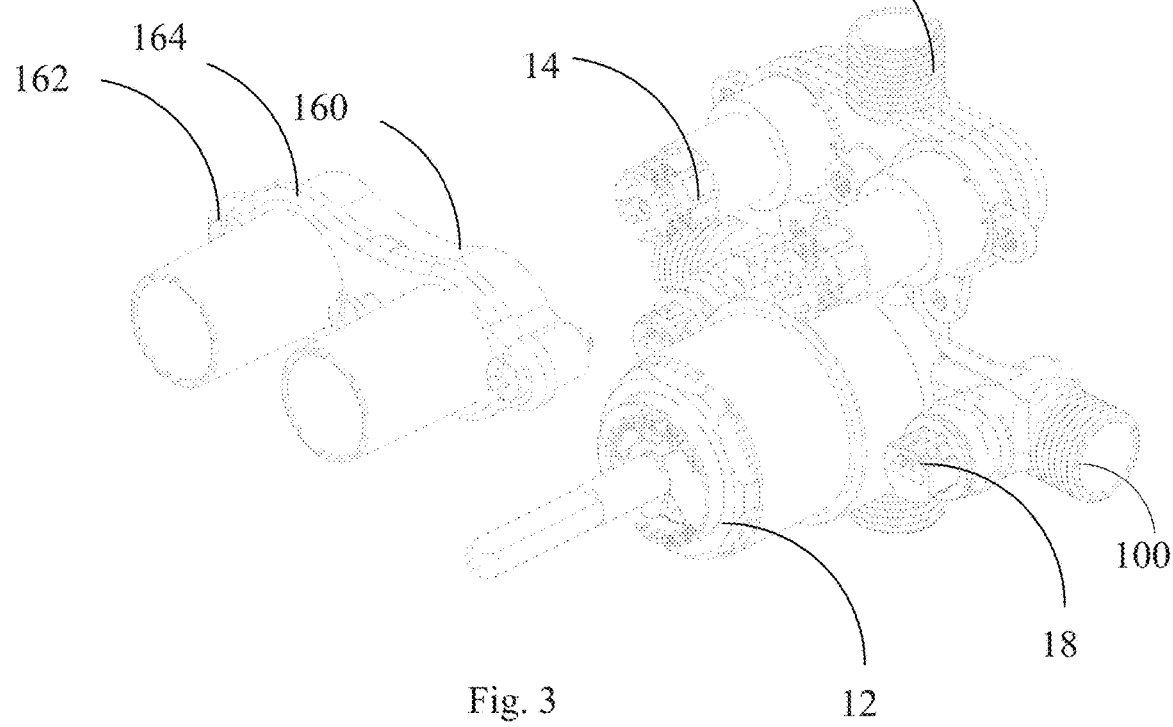
FIG. 3 is a partially exploded view of the shower controlling device according to present disclosure.
Figure 4:
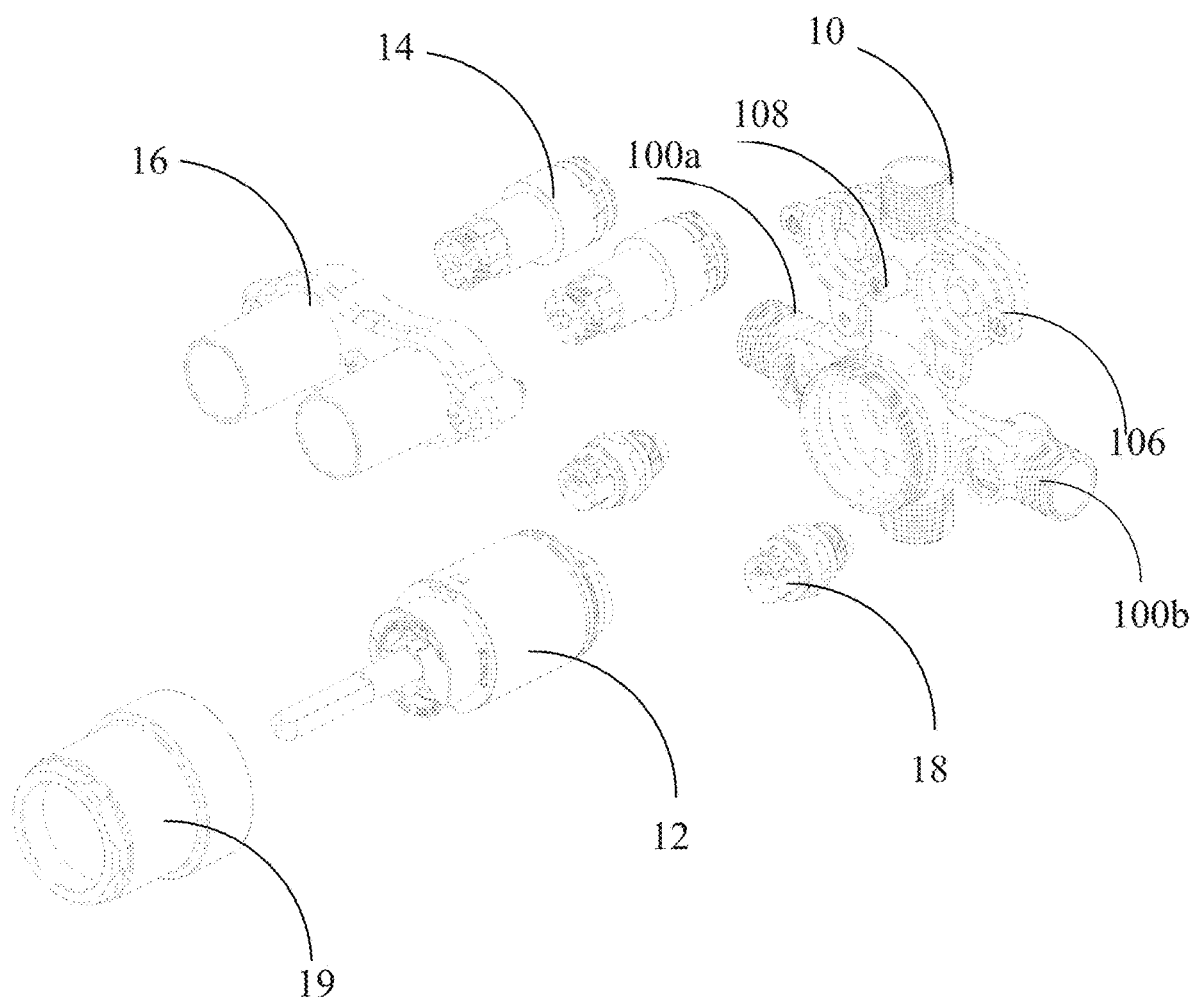
FIG. 4 is an exploded view of the shower controlling device according to present disclosure.
Figure 9:
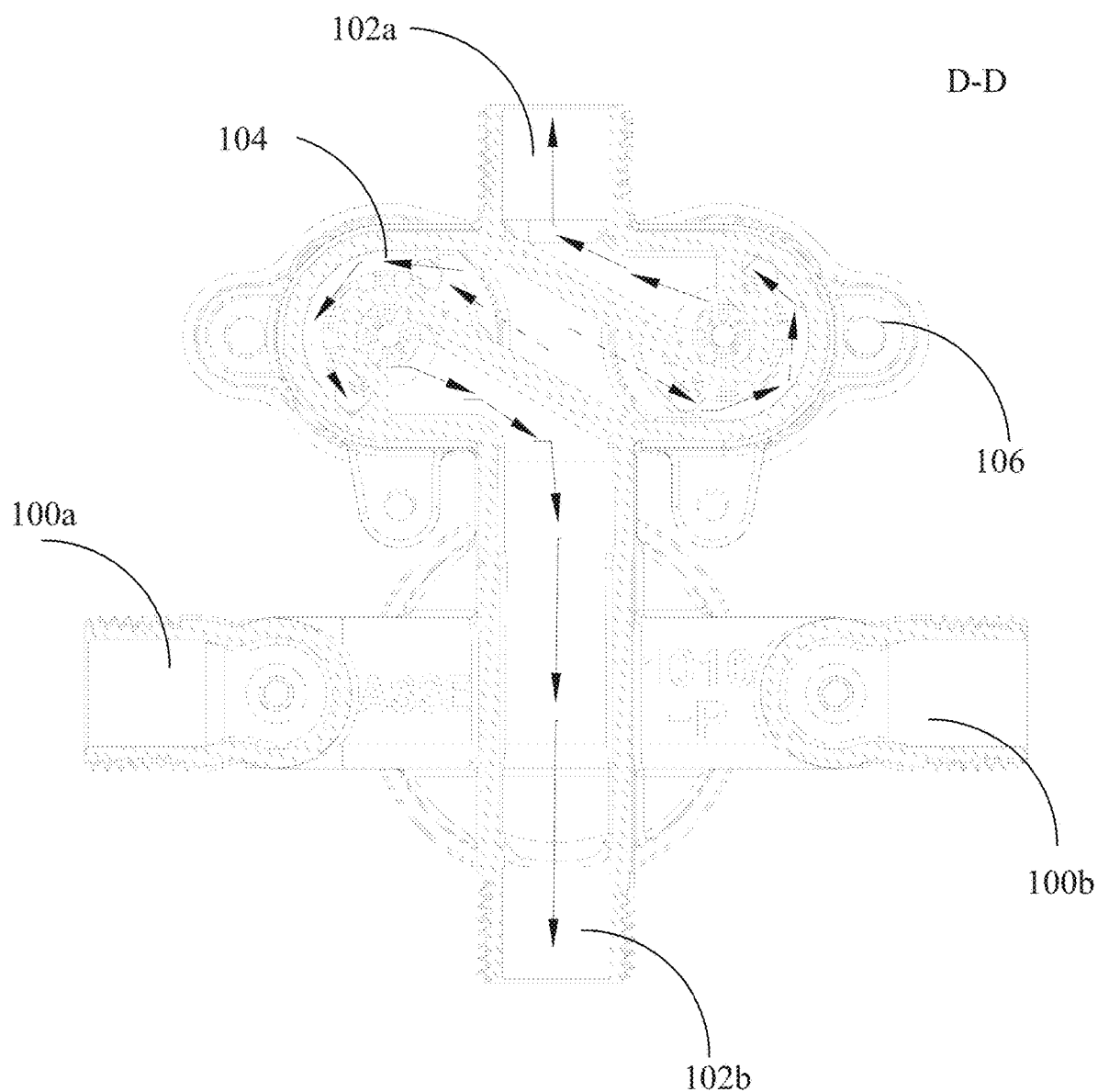
FIG. 9 is a sectional view of FIG. 7 along cut line D-D.

FIG. 3 is a partially exploded view of the shower controlling device 1 according to present disclosure, and FIG. 4 is an exploded view of the shower controlling device 1 according to present disclosure. As shown in FIGS. 3 and 4, the body part 10 comprises water inlets 100 supplying hot fluid and cold fluid respectively, water outlets 102 discharging the mixed fluid and outlet cavity 104 (as shown in FIG. 9).

Water inlets 100 can be for example first water inlet 100a, second water inlet 100b, respectively, and water outlets 102 can be configured in pairs and they are disposed opposite to each other and perpendicular to the foresaid water inlets 100. The water outlets 102 can be for example first water outlet 102a and second water outlet 102b, respectively. The first water inlet 100a and the second water inlet 100b are disposed opposite to each other, and the water outlets 102 are disposed perpendicular to the water inlets 100. As mentioned above, the switching valve 14 is used for controlling the on-off of the mixed fluid entering the outlet cavity 104 and mixed by the mixing valve 12 to the water outlet 102 (e.g., the first water outlet 102a and/or the second water outlet 102b).

Outlet cavity 104 is configured as a centrosymmetric structure and communicating with water outlets 102. The outlet cavity 104 is communication with the second cavity receiving the switching valve 14, or the second cavity is configured as a part of the outlet cavity 104. In this text, the outlet cavity 104 can be configured for example in the shape of "S" and the outlet cavity 104 is connected at each end to one of the water outlets 102 controlled by the corresponding switching valve 14. Two switching valves 14 each are used for controlling the on-off of the mixing fluid to the first water outlet 102a and the second water outlet 102b. It is conceivable for the skilled artisan that the outlet cavities 104 with other centrosymmetric structure do not depart from the protection scope of this invention.

Figure 5:
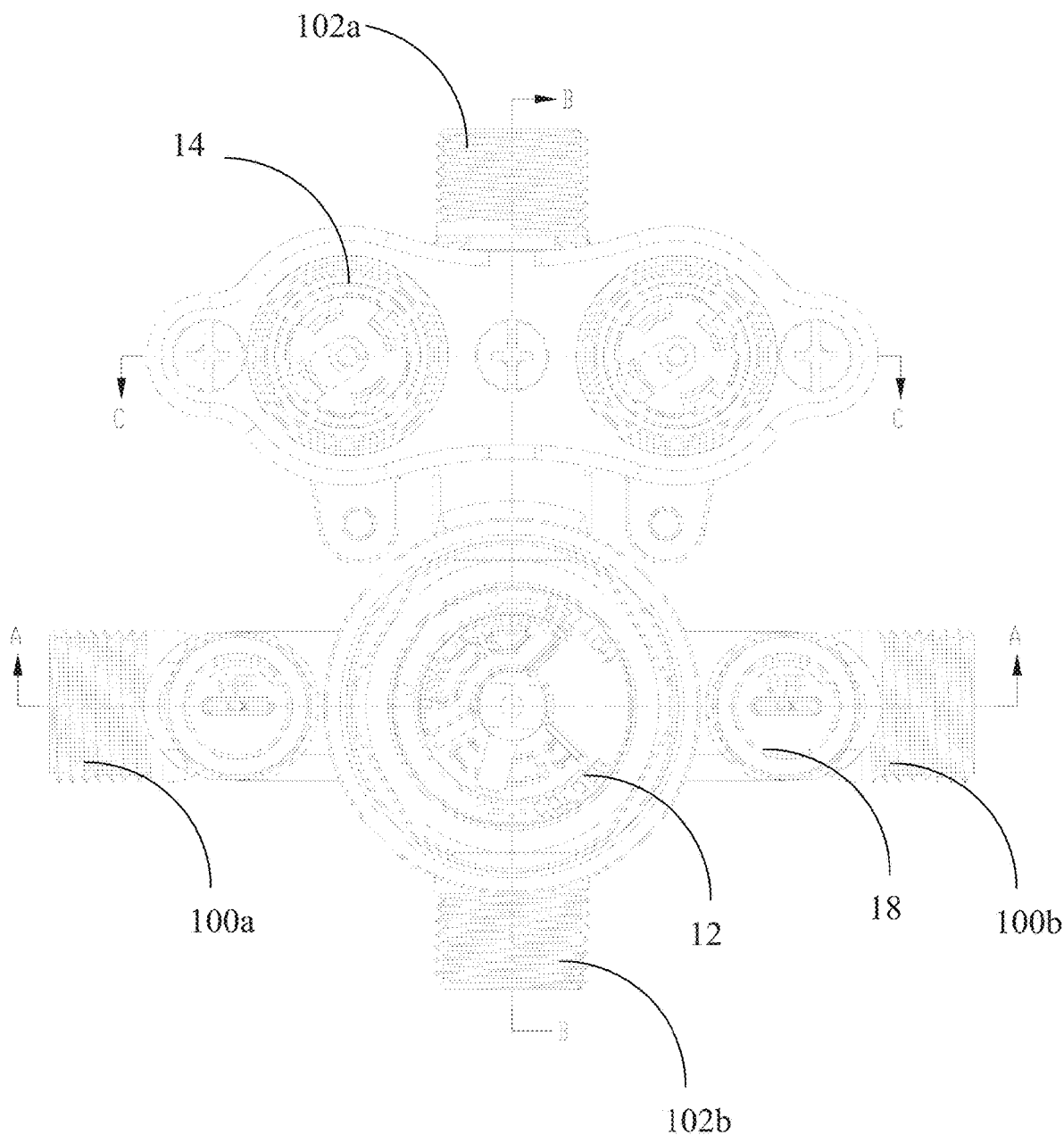
FIG. 5 is a top view of the shower controlling device according to present disclosure.

FIG. 5 is a top view of the shower controlling device according to present disclosure. It shows the body part 10, the valve cover set 16 as well as the mixing valve 12, switching valve 14 and one-way shut-off valve 18, which are mounted on the body part 10. The figure shows the water inlets 100 and the water outlets 102 of the body part 10. The water inlets 100 and the water outlet 102 both are two, i.e., the first water inlet 100a, the second water inlet 100b, the first water outlet 102a, and the second water outlet 102b. The body part is in shape of cross, and two water inlets 100a, 100b are disposed opposite to each other in the general transverse direction of the body part 10, and two water outlets 102a, 102b are disposed opposite to each other in the general vertical direction of the body part 10. In this text, the first water outlet 102a and the second water outlet 102b can also be referred as upper water outlet and lower water outlet and they are connected to the bath shower and bathtub faucet, respectively. Certainly, this is not limited to the first water outlet 102a and the second water outlet 102b, and they can be adapted by the skilled artisan as required, which does not depart from the protection scope of this invention.

Figure 6:
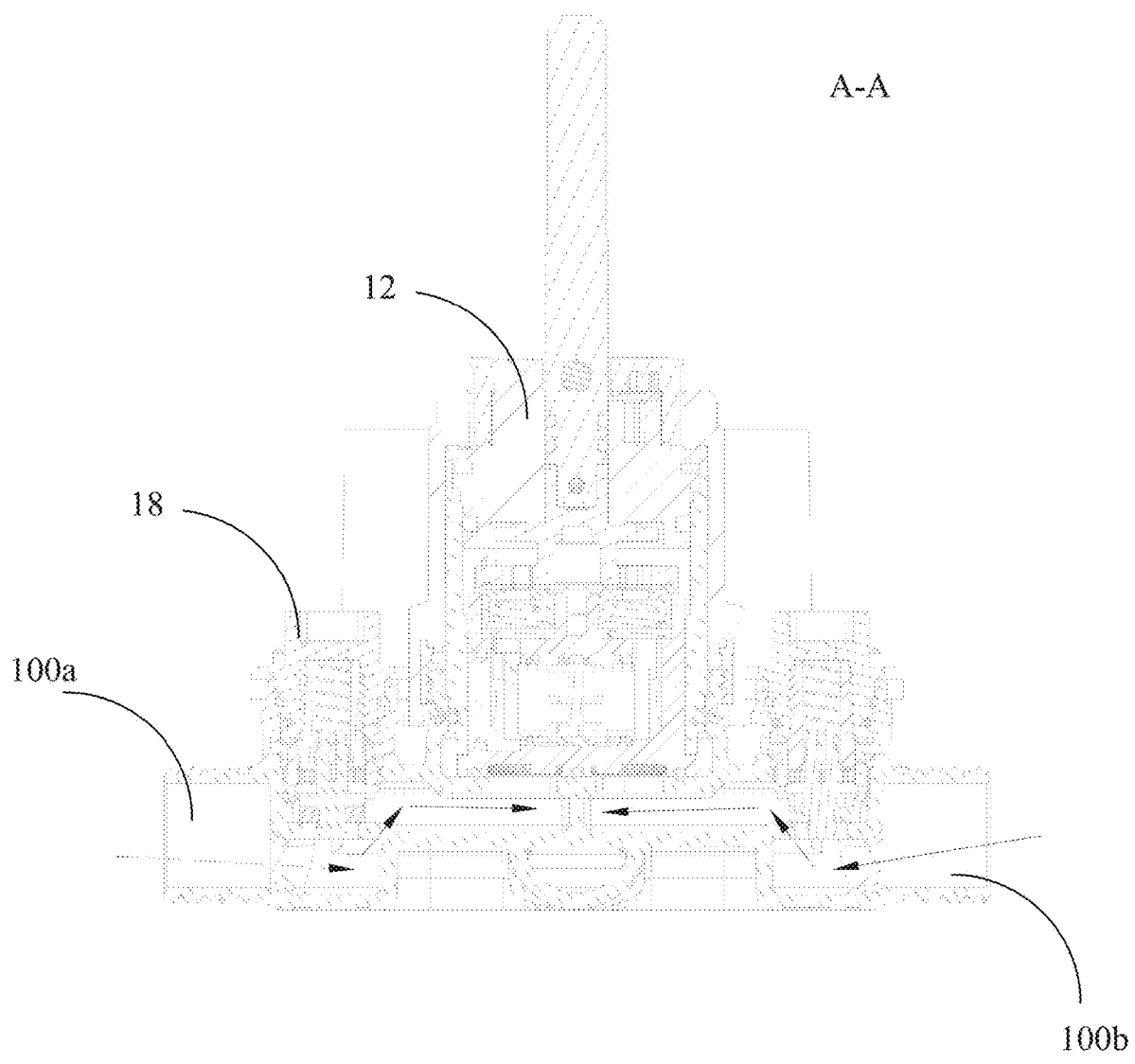
FIG. 6 is a sectional view of FIG. 5 along cut line A-A.
Figure 7:
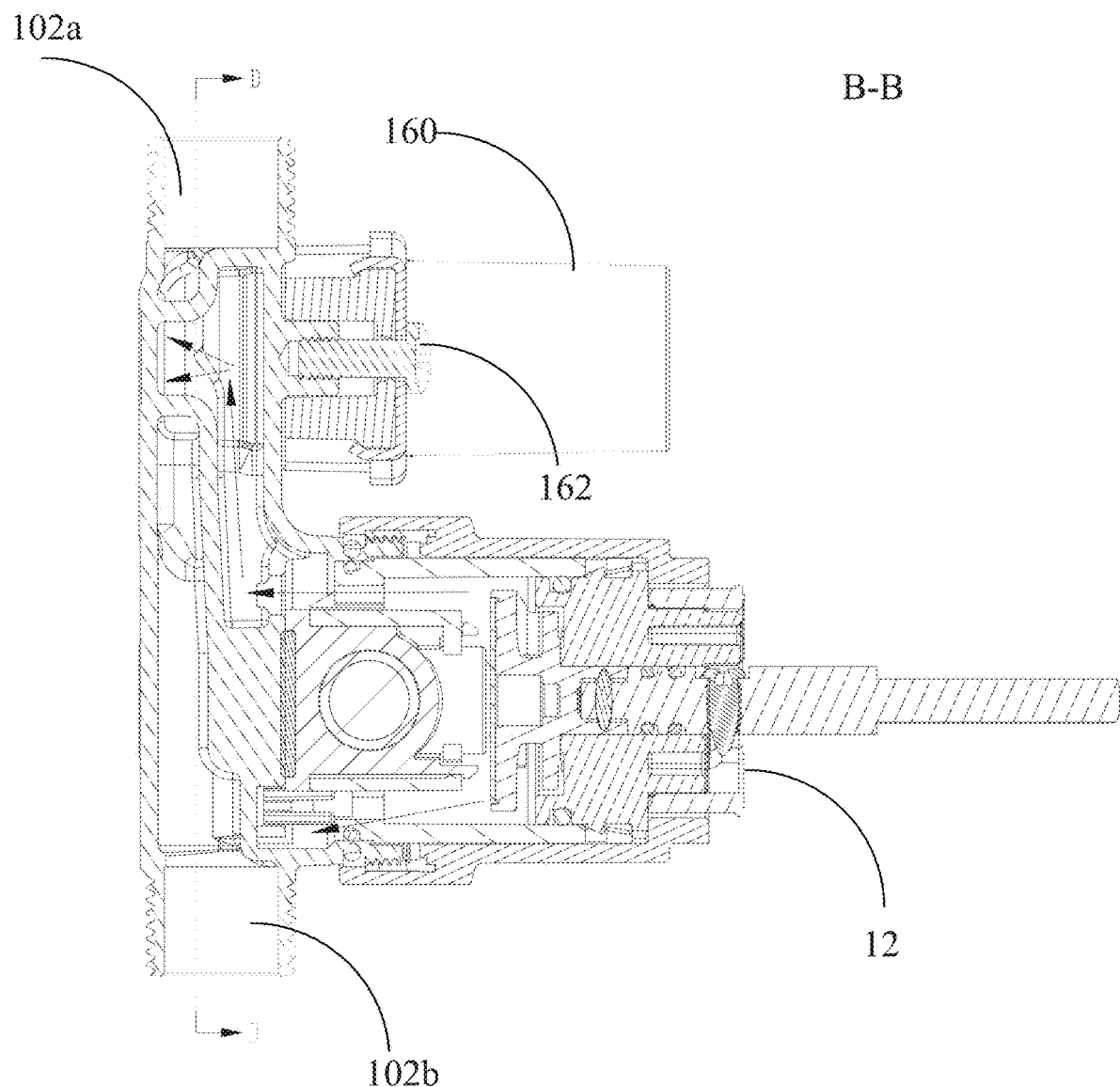
FIG. 7 is a sectional view of FIG. 5 along cut line B-B.
Figure 8:
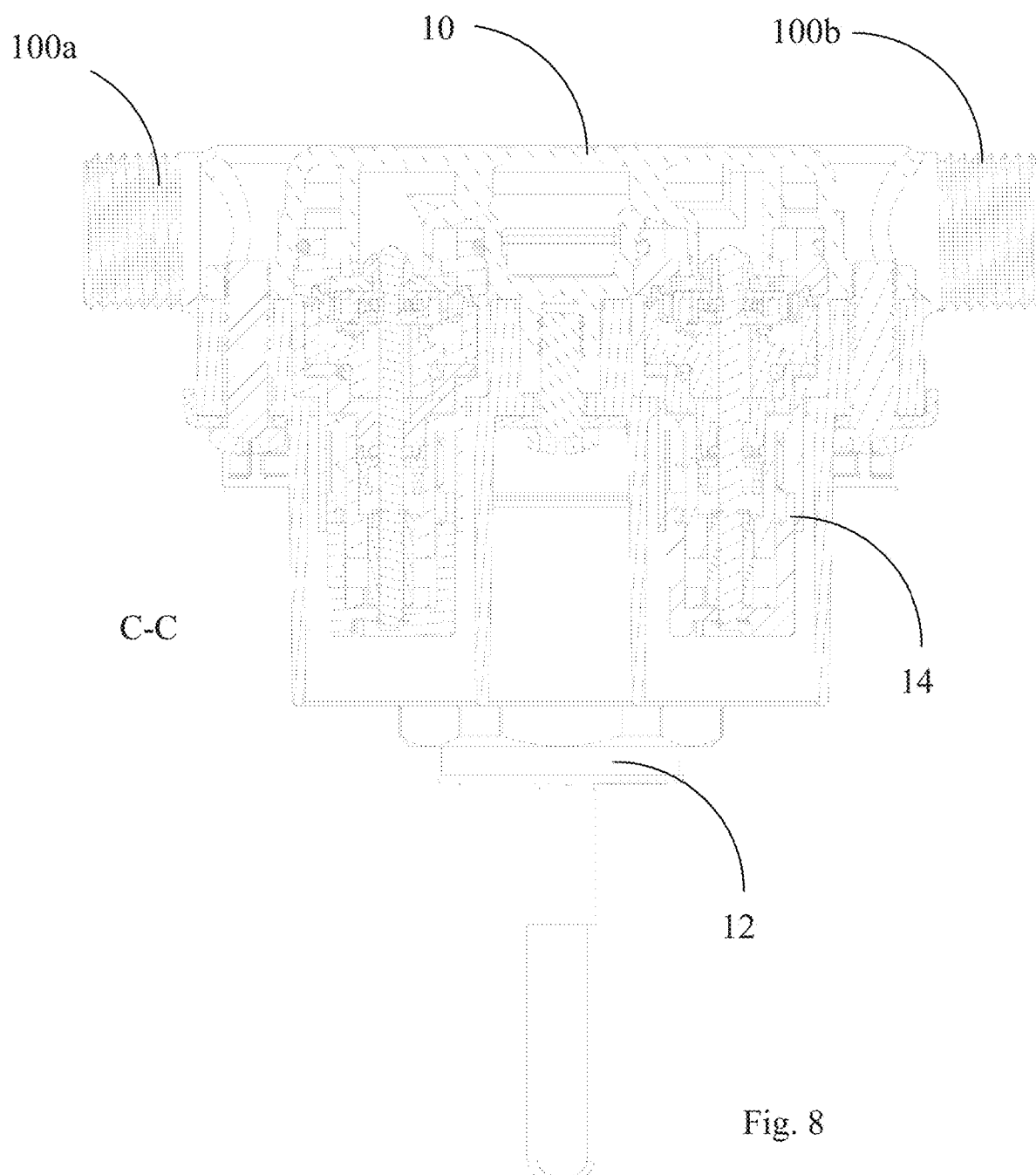
FIG. 8 is a sectional view of FIG. 5 along cut line C-C.

FIGS. 6-8 are sectional views of FIG. 5 along cut line A-A, cut line B-B and cut line C-C. FIG. 9 is a sectional view of FIG. 7 along cut line D-D. FIGS. 6-9 show the flow paths of the fluid in the shower controlling device 1.

Referring to FIG. 6, the cold fluid and the hot fluid are represented by black arrows. The cold fluid and the hot fluid enter the body part 10 from each of two water inlets, such as the first water inlet and the second water inlet 100a, 100b, flow through the one-way shut-off valve 17 and go though the mixing valve 12, and they are mixed under the control of the mixing valve 12 to produce the mixing fluid meeting the temperature requirement.

Referring to FIG. 7, the mixed fluid is represented by black arrows. The mixed fluid being mixed in the mixing valve 12 flows out of the mixing valve 12 and flows into the outlet cavity 104 through the fluid guide section of the superstructure of the body part 10. Under the control of the switching valve 14, the mixed fluid can optionally flows to the uppers water outlet of the understructure of the body part 10 stated below so as to supply it to the bath shower or flows to the lower water outlet so as to supply it to bathtub faucet. In this text, the upper water outlet and the lower water outlet are defined as being disposed in the upper and lower direction of axial direction of two outlets as shown in FIG. 5. Certainly, it can be appreciated for the skilled artisan that the functions of the upper water outlet and the lower water outlet are not limited to this, and the functions thereof can be exchanged or connected to other faucet or water outlet fittings as desired.

Referring to FIG. 8, it shows the switching valve 14 that controls the on-off of the mixing fluid to every water outlet 102. This figure also shows the body part 1 with double-levels structure.

Referring to FIG. 9, it explicitly shows the understructure of the body part 1. The mixed fluid flows into the outlet cavity 104 at a general center (referring to FIG. 10) thereof, and through the mutual centrosymmetric paths of the outlet cavity 104 under the control of the corresponding switching valve 14, and to the corresponding water outlet 102. A pair of switching valves 14 are disposed in the receiving cavity of the corresponding body parts provided with outlet cavity 104 and disposed equidistantly relative to the position that the mixed fluid enters the outlet cavity 104, i.e., they are symmetric disposed relative to the axis of a pair of water outlets disposed opposite to each other. The unique configuration of the outlet cavity 104 is provided, which avoids the occurrence of problem that the mixed fluid is limited on its flow due to the possible overlap of paths of the water outlets when it faces different water outlets 102.

Figure 10:
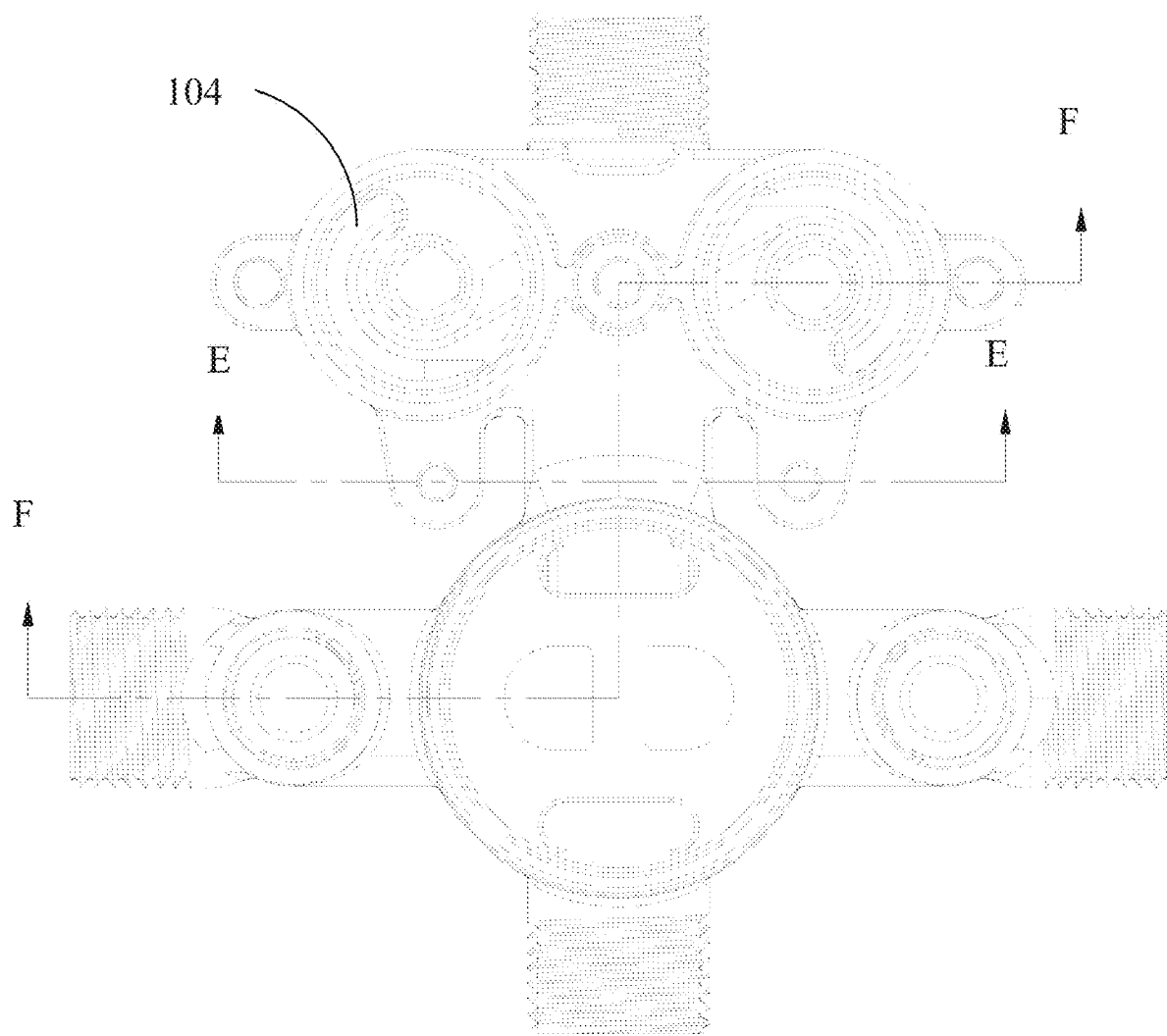
FIG. 10 is a top view of the body part of the shower controlling device according to present disclosure, wherein the switching valve, mixing valve and one-way shut-off valve have not been assembled.

FIG. 10 is a top view of the body part 1 of the shower controlling device according to present disclosure, wherein the switching valve, mixing valve and one-way shut-off valve have not been assembled for easy to observe the body part 10. As shown in FIG. 10, the receiving cavity is a cavity provided on the body part 10 for receiving the switching valve 14 (which is not indicated in this figure). The receiving cavity includes an outlet cavity 104 and guiding outlet(s) 105. The mixed fluid entering the outlet cavity 104 flows through the switching valve 14 and to the corresponding water outlet through the guiding outlet 105. The outlet cavity 104 includes a guiding section and a transition section, wherein the guiding section is connected to the flow guiding section in the body part 10 that is communicated with the mixing valve 12, and the mixed fluid is guided into the outlet cavity 104 from the guiding section and connected to the switching valve through the transition section. The guiding section and the transition section form a curved section (which is conformal to the periphery of the receiving cavity, and it is certain that it is easy for the skilled artisan to conceive other possible shapes in the light of present disclosure, which does not depart from the protection scope of this invention) with area being half or two-third of the receiving cavity (except for the guiding outlet 105) of the body part 10. The receiving cavity on the body part 10 for receiving the other switching valve 14 and the foresaid receiving cavity are symmetrically disposed relative to the axis of two water outlets. In other words, the mixed fluid flows out of the mixing valve 12 and into the S-shaped outlet cavity 104, and out from the guiding outlet 105 under the control of the switching valve 14, and then it is lead to the first water outlet 102a and/or the second outlet 102b as required.

Figure 11:
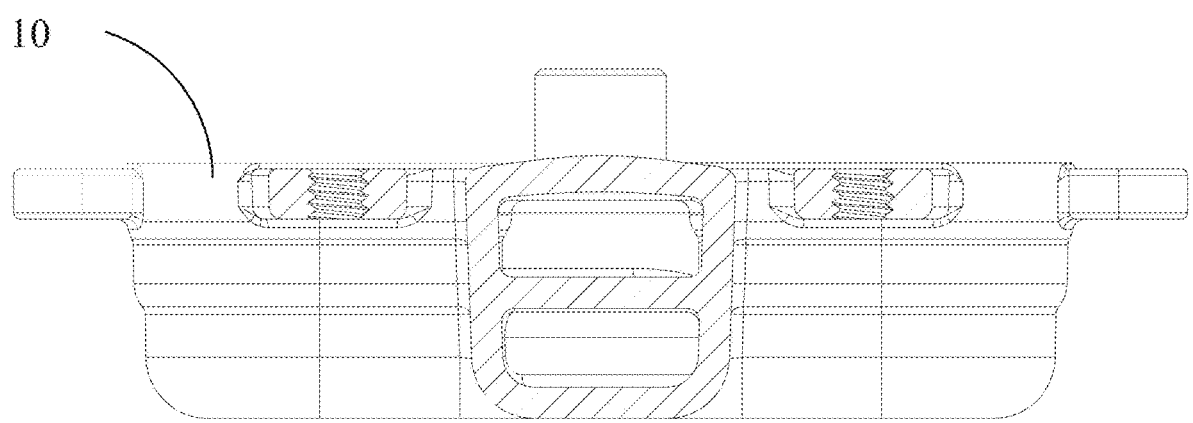
FIG. 11 is sectional view of FIG. 10 along cut line E-E.

FIG. 11 is sectional view of FIG. 10 along cut line E-E. FIG. 11 shows that the mixed fluid flows out of the mixing valve 12, into the upper open of the guiding section, and into the lower open of the second water outlet 102b. As seen from FIG. 11, the body part 10 comprises a double-levels structure. FIG. 9 is a schematic view showing the understructure of the body part, and FIG. 10 is a schematic view showing the superstructure of the body part. Specifically, a portion of guiding section for the mixed fluid flowing out from the mixing valve 12 is located at the upper level of the body part 10, and a portion of guiding section for dispending fluid to different switching valves 12 is connected through the superstructure and the understructure of the body part 10 so as to contain the mixed fluid with more volume flow. Then, the mixed fluid flow through the outlet cavity 104, flows through the guiding outlet 105 under the control of switching valve 14, and flows to the corresponding outlet 102 through the other guiding section in the lower level.

Figure 12:
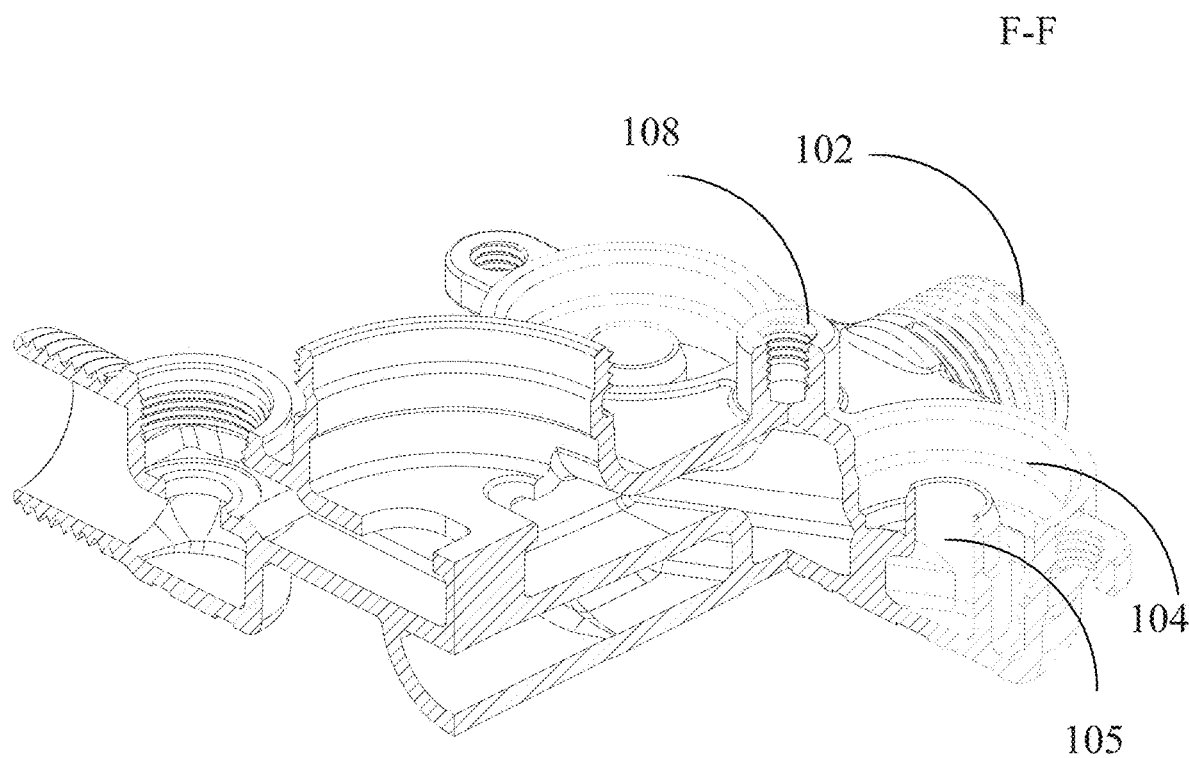
FIG. 12 is sectional view of FIG. 10 along cut line F-F.
Figure 13:
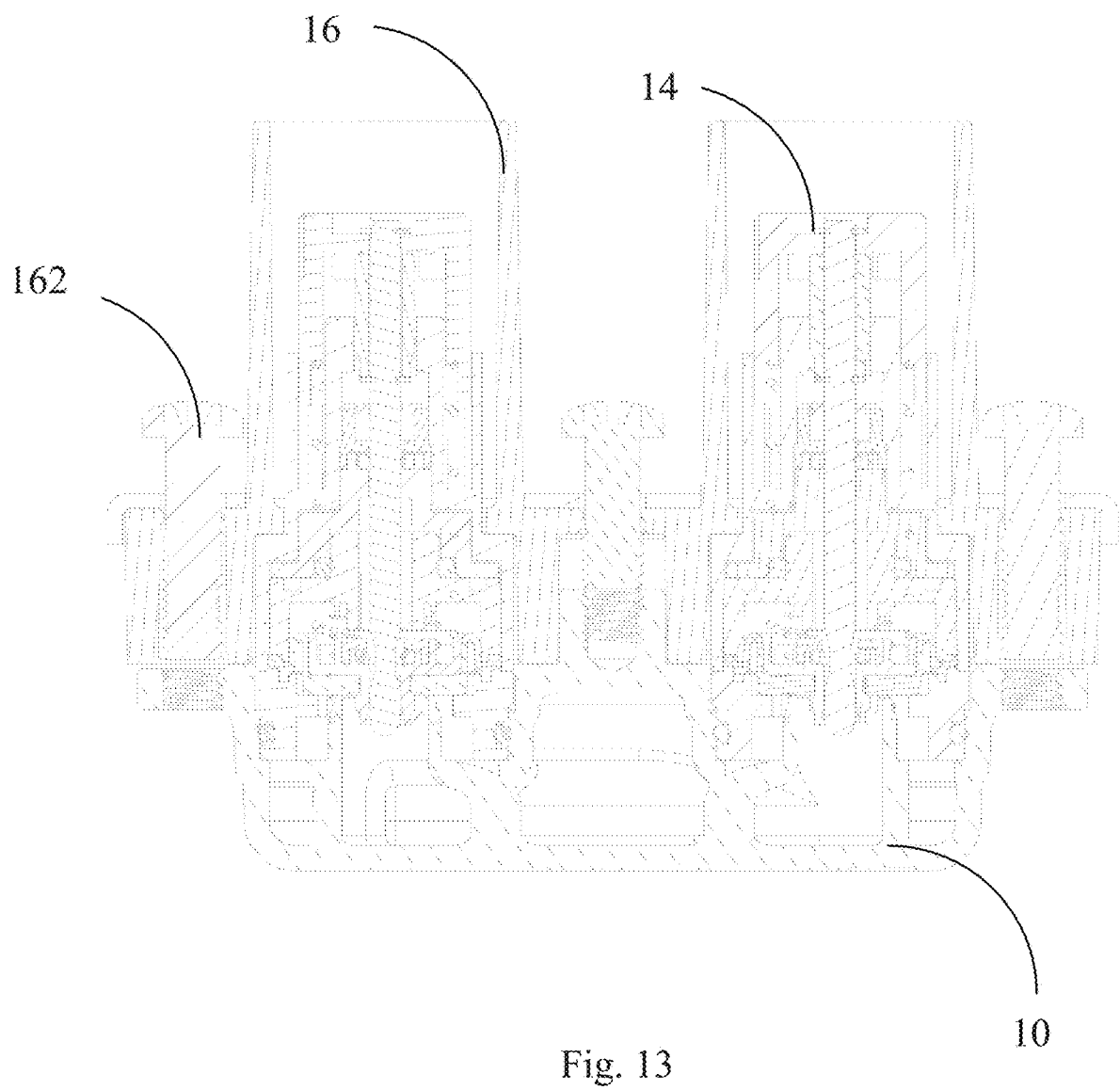
FIG. 13 is sectional view of assembling the valve cover set, switching valve and body part together.

FIG. 12 is sectional view of FIG. 10 along cut line F-F. The figure clearly shows the superstructure and the understructure of the body part 10. As seen from this figure, the mixed fluid being mixed by the mixing valve is lead out through the portion of guiding section of the body part 10, and then delivered to every outlet cavity 102 through the other guiding section connecting the superstructure and the understructure. Under the control of the switching valve 14, the mixed fluid is delivered to the corresponding water outlet.

Figure 14:
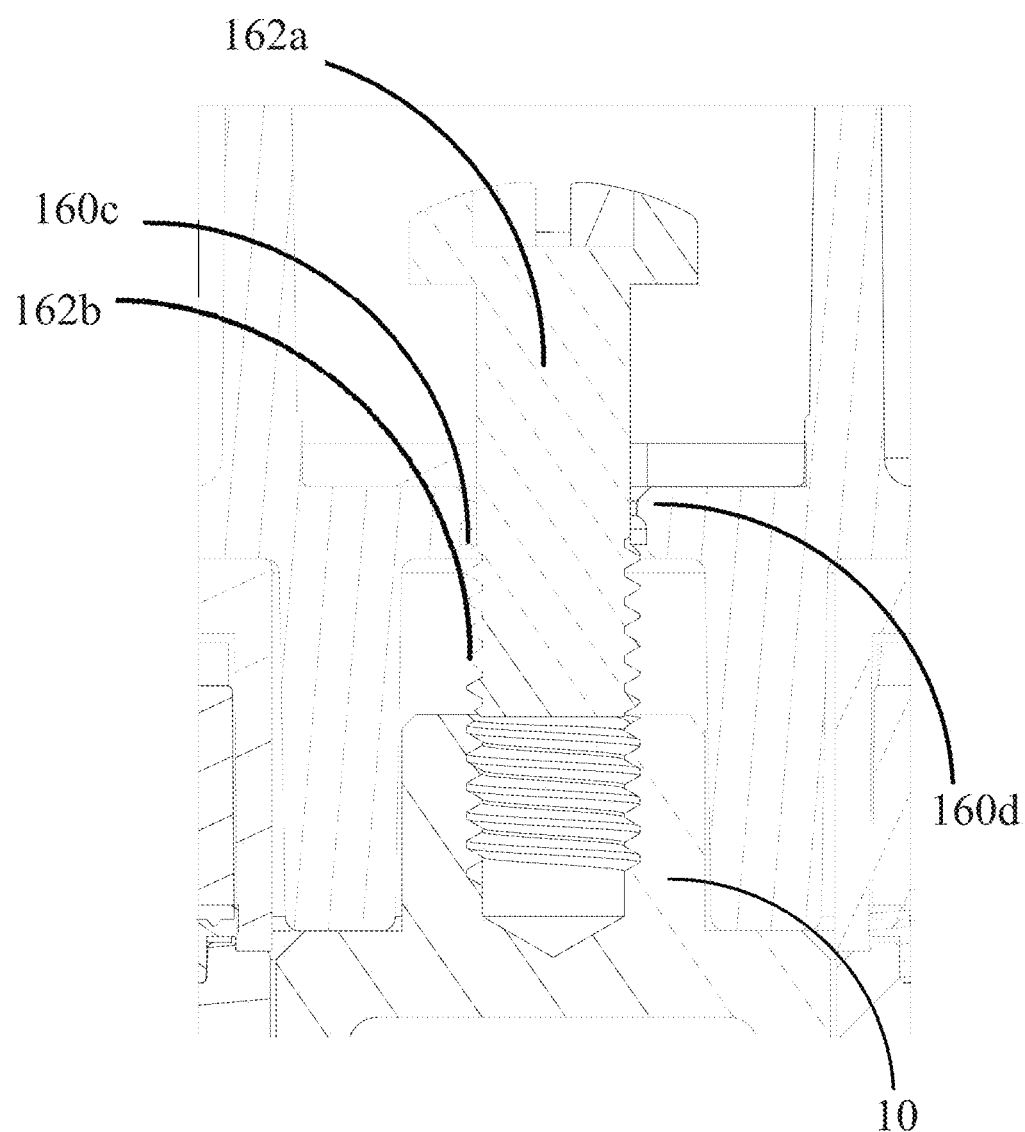
FIG. 14 is a sectional view of FIG. 13 comprising valve cover set and the fastener in the middle position thereof, wherein the fastener is in a first unengaged state.

FIGS. 13-17 show the different states of the fastener 162 engaging with the cover 160. FIG. 10 is sectional view of assembling the valve cover set 16, switching valve 14 and body part 10 together, wherein the valve cover set 16 is sleeved on the switching valve 14, and the fastener 162 is in the unengaged first state. FIG. 14 is a sectional view of FIG. 13 that the fastener 162 is located at the middle position thereof, wherein the fastener 162 is in the unengaged first state. The base 160a of the cover 160 is provided with engagement holes 160c, and the engagement holes 160c are correspondingly provided relative to the mounting holes 164b of the panel 162 and provided with limiting portion 160d. The limiting portion 160d protrudes radially inward from the circumference of the engagement holes 160c, and the limiting portion 160d is configured to prevent the fastener 162 from disengaging f from the base 160a after it is inserted into the engagement hole 160c of the base 160a, thereby avoiding the problem of loss of the components due to the valve cover set 16 as an individual module.

In this text, the limiting portion 160d is optionally a pair of protrusions extending radially inward from the circumference of the engagement hole 160c. The diameter defined by the protrusion is preferably larger than that of the free section 162b of the stem of the fastener 162, but smaller than that of the engagement section 162a of the stem, in particular the major diameter of the screw thread of the engagement section 162a of the stem. In this invention, the protrusion can also be configured as a clastic cantilever, screw thread, spline or other toothed structure, etc. The protrusion can be for example configured as being asymmetrically and/or unevenly disposed. The protrusion can be configured being elastic to some extent so that the engagement section 162a of the fastener 162 cannot be impeded when it passes the protrusion. Preferably, the protrusions are provided with a guiding slope in the direction of the fastener moving downwards so as to better guide the engagement portion 108 to pass the section defined by the protrusions. The protrusions for example limit the engagement hole 160c as a portion with reduced diameter at the upper surface proximate to the engagement hole 160c. The fastener 162 comprises an engagement section 162a and a free section 162b. The engagement section 162a is configured as a threaded section, which goes through the engagement hole 160c and the portion with reduced diameter formed by the limiting portion 160d. The engagement section 162a can be detachably engaged to the body part 10.

The diameter of the hole formed by the protrusions is less than that of the engagement section 162a of the screw. The fastener 162 is prevented from disengaging when moving in the direction of disengaging the engagement hole 160c by the limiting portion 160d (i.e. the protrusion) against the engagement section 162a. The free section 162b is configured as a smooth section and not provided with screw thread. The free section 162b can freely go through the engagement hole 160c without suffering hinders. The engagement section 162a of the fastener 162 has a longitudinal length less than that of the free section 162b. In this way, when disassembling, the fastener 162 does not collide with the protrusions and damage it before the fastener leaving the body part 10.

Figure 15:
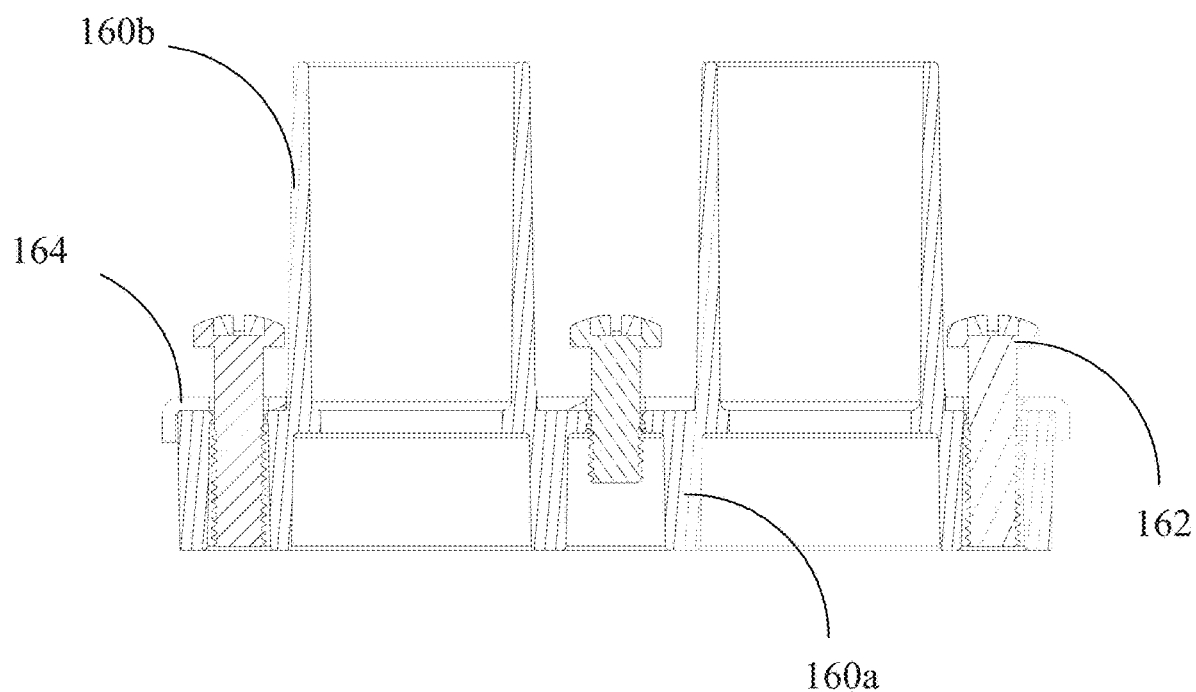
FIG. 15 is a sectional view of the shower controlling device according to present disclosure, wherein the fastener is in a first unengaged state.

FIG. 15 is a sectional view of the shower controlling device 1 according to present disclosure, wherein the fastener is an unengaged state. As shown in the figure, the cover 160 has two cylindric receiving portions 160b, both of which are used for receiving the switching valves 14 each for controlling the bath shower and the bathtub faucet (or basin faucet, and it is adapted for the skilled artisan as required, which does not depart from the protection scope of this application). The cover 160, the panel 162 and the fasteners 162 constituting the valve cover set 16 can be an individual module for use before being assembled. Alternatively, the valve cover set 16 can be preassembled with the body part as a preassembly. The preassembly provided is convenient for assembling, improving the assembly efficiency and avoiding the inconvenient of losing the components.

Figure 16:
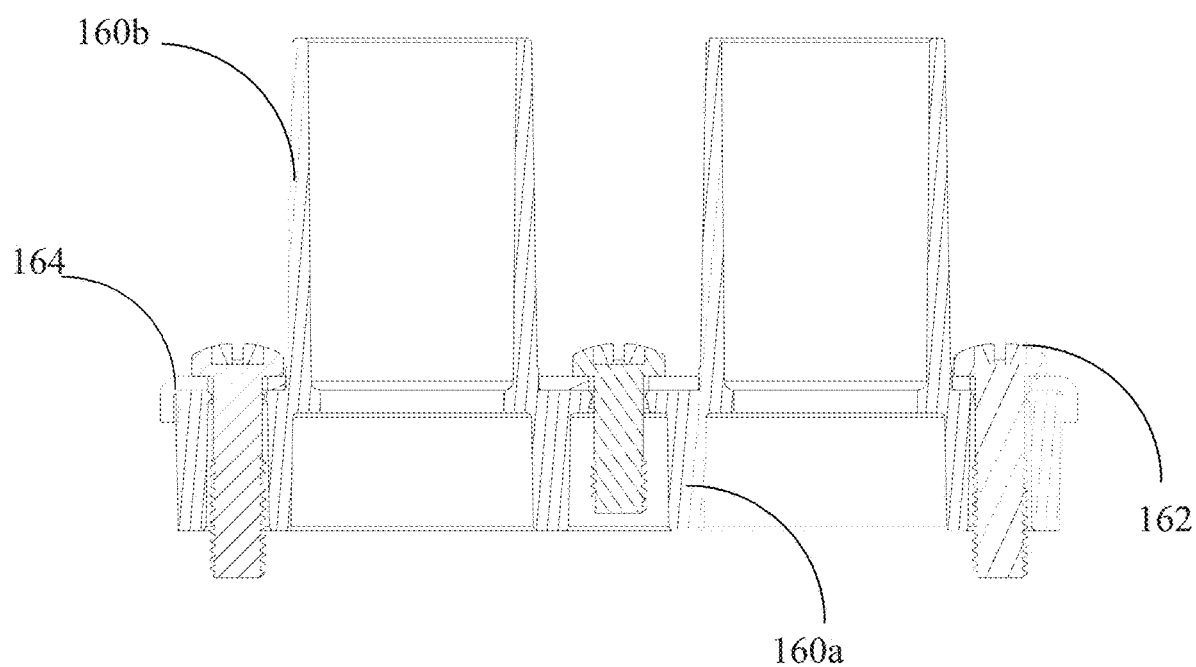
FIG. 16 is a sectional view of the valve cover set shown in the of FIG. 15, wherein the fastener is in a second state to be engaged.
Figure 17:
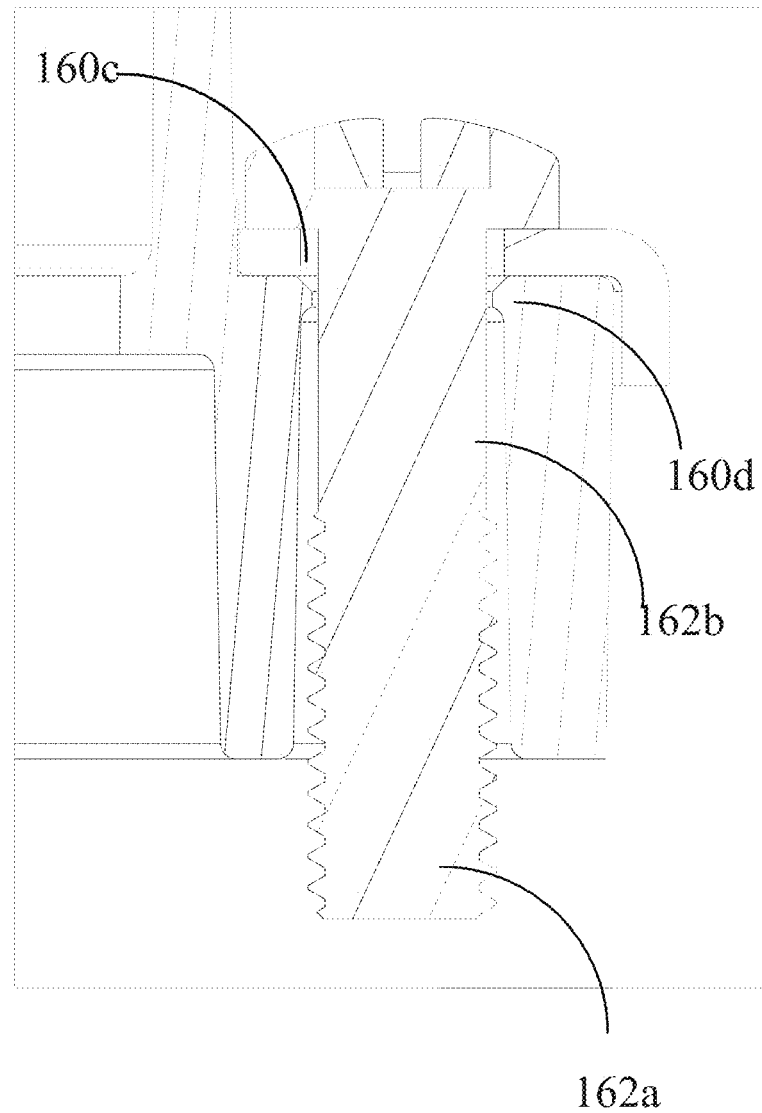
FIG. 17 is a sectional view of the fastener shown in FIG. 16, which fastener is at the right of the valve cover set.

FIG. 16 is a sectional view of the valve cover set 16 shown in FIG. 15, wherein the fastener 162 is in a second state to be engaged. Since the body part 10 is not shown in FIG. 13, the fasteners 162 in this figure are not engaged to the body part 10. Nevertheless, the fasteners 162 shown in the figure represent a position that the fasteners 162 are engaged to the body part 10, and this position is also referred as the second state of the fastener to be engaged. FIG. 14 shows the fastener which is located on the right of the valve cover set 16 in FIG. 13. As seen from this figure, the fastener 162 comprises a head and a stem, wherein the stem is composed of aforesaid engagement section 162a and the free section 162b. At this position, the stem of the fastener 162 completely goes through the engagement hole 160c of the base 160a, and the head of the fastener 162 resist against the panel 162 sleeved on the base 160a. Since the radial diameter formed by the limiting portion 160d of the base 160a is less than the diameter of the engagement section 162a of the fastener 162, thus, the fastener 162 is hold in the base 160a and does not disengage from the base 160a.

Referring to FIGS. 4 and 9 again, the body part 10 also includes engagement lugs 106 and an engagement portion 108. The engagement lugs 106 are symmetric relative to the engagement portion 108 and are collinear with the engagement portion 108 so that the body part 10 is evenly and symmetrically stressed when it is engaged with the valve cover set 16. The engagement lugs 106 are configures as one pair and disposed in the radial direction of the body part 10 opposed to each other, and the engagement lugs 106 are configured for engaging with the fasteners 162. The engagement portion 108 is provided between the pair of the lugs and extends from the surface of the body part 10 towards the valve cover set 16. On the body part, the engagement portion 108 is provided higher than the engagement lugs.

The present disclosure provides a shower controlling device comprising the body part and the valve cover set with unique structural design, wherein the body part has the outlet cavity with inventive structural design, which avoids the occurrence of problem that the mixed fluid is limited on its flow due to the possible overlap of paths of the water outlets when it faces different water outlets 102. The valve cover set is presented as an individual module, which provides enhanced structural strength, facilitates to be installed and maintained, lowers the cost, and meanwhile it avoids the occurrence of problem losing the components. This shower controlling device has good structural stability and can be efficiently assembled, which improves or solves the problems presented in prior arts.

Although the invention is described through limited quantities embodiments, it is understood that the invention is not limited by such disclosed embodiments. Rather, any changes, modifications, replacements or equal devices which are not described previously are incorporated to revise the invention, however, which are equivalent to the spirit and scope of the invention. Furthermore, while various embodiments of the invention have been described, it is understood that the aspect of the invention can merely include some of the embodiments. Therefore, the invention is not regarded to be limited by the aforesaid description, however it is only limited by the appended claims.

LIST OF REFERENCE NUMERALS

1—shower controlling device
10—body part
100—water inlet
100a—first water inlet
100b—second water inlet
102—water outlet
102a—first water outlet
102b—second water outlet
104—outlet cavity
105—guiding outlet
106—engagement lug
108—engagement portion
12—mixing valve
14—switching valve
16—valve cover set
160—cover
160a—base
160b—receiving portion
160c—engagement hole
160d—limiting portion
162—fastener
162a—engagement section
162b—free section
164—panel
164a—receiving hole
164b—mounting hole
18—shut-off valve
19—mixing valve cover

What is claimed is:

1. A shower controlling device, the device comprising:
a body part, comprising a plurality of water inlets supplying hot fluid and cold fluid respectively, a pair of water outlets for discharging mixed fluid, and an outlet cavity, wherein the plurality of water inlets are disposed opposite to each other, and the pair of water outlets are perpendicular to the plurality of water inlets, and the outlet cavity is configured as a centrosymmetric structure and in communication with the pair of water outlets;
a mixing valve engaged with the body part and configured for mixing the cold fluid and the hot fluid entering the body part;
switching valves disposed downstream of the mixing valve and configured to control a flow of the mixed fluid from the outlet cavity to the pair of water outlets; and
a valve cover set detachably engaged with the body part and inside which a switching valve of the switching valves is sleeved so as to fixedly engage the switching valve to the body part,
wherein the pair of water outlets are disposed opposite to each other and perpendicular to the plurality of water inlets, and the outlet cavity is configured in S shape and can be communicated at each end to one of the pair of water outlets controlled by a corresponding switching valve.

2. The shower controlling device according to claim 1, wherein the valve cover set comprises:
a cover, comprising a base and one or more receiving portions, wherein the base is engaged to the body part and conformed to the outlet cavity of the body part, and the one or more receiving portions extends perpendicular to the base to sleeve the switching valve therein; and
fasteners, configured for securing the cover to the body part.

3. The shower controlling device according to claim 2, wherein the valve cover set further comprises a panel, which is conformed to the base and comprises:
a plurality of receiving holes configured for the one or more receiving portions of the cover to pass through,
a plurality of mounting holes configured for the fasteners to pass through and engage the body part; and
the panel is configured to be sleeved on the cover through one or more receiving holes of the plurality of receiving holes and is fixed to the body part by means of the fasteners going through the plurality of mounting holes so as to enhance a structural strength of the cover.

4. The shower controlling device according to claim 3, wherein the base of the cover is provided with one or more engagement holes, each of which is disposed correspondingly to at least one of the plurality of mounting holes and provided with a limiting portion, wherein the limiting portion is configured for preventing a fastener of the fasteners from disengaging from the base.

5. The shower controlling device according to claim 4, wherein the fastener comprises:
an engagement section configured to pass through the one or more engagement holes and wherein the engagement section is configured to be detachably engaged to the body part, wherein the fastener is prevented from disengaging when moving in a direction of disengaging from the one or more engagement holes due to an obstruction of a projection against the engagement section; and
a free section configured to pass through the one or more engagement holes and move freely therein.

6. The shower controlling device according to claim 5, wherein an axial length of the engagement section is less than an axial length of the free section.

7. The shower controlling device according to claim 4, wherein the body part further comprises:
engagement lugs, wherein a pair of engagement lugs are disposed in a radial direction of the body part corresponding to the one or more engagement holes; and
an engagement portion, disposed between the pair of engagement lugs and the engagement portion is set above the engagement lugs.

8. The shower controlling device according to claim 1, further comprising a pair of one-way shut-off valves, wherein at least one of the one-way shut-off valves is engaged to the body part and located between a corresponding water inlet and the mixing valve.

9. The shower controlling device according to claim 2, further comprising a mixing valve cover, wherein the mixing valve cover, the mixing valve and the body part all three together, or the valve cover set and the body part both together are configured as a preassembly.

* * * * *